J. A. BUTLER.
CONTROLLING DEVICE FOR VOTING MACHINES AND THE LIKE.
APPLICATION FILED DEC. 26, 1912.
1,156,028.  Patented Oct. 5, 1915.
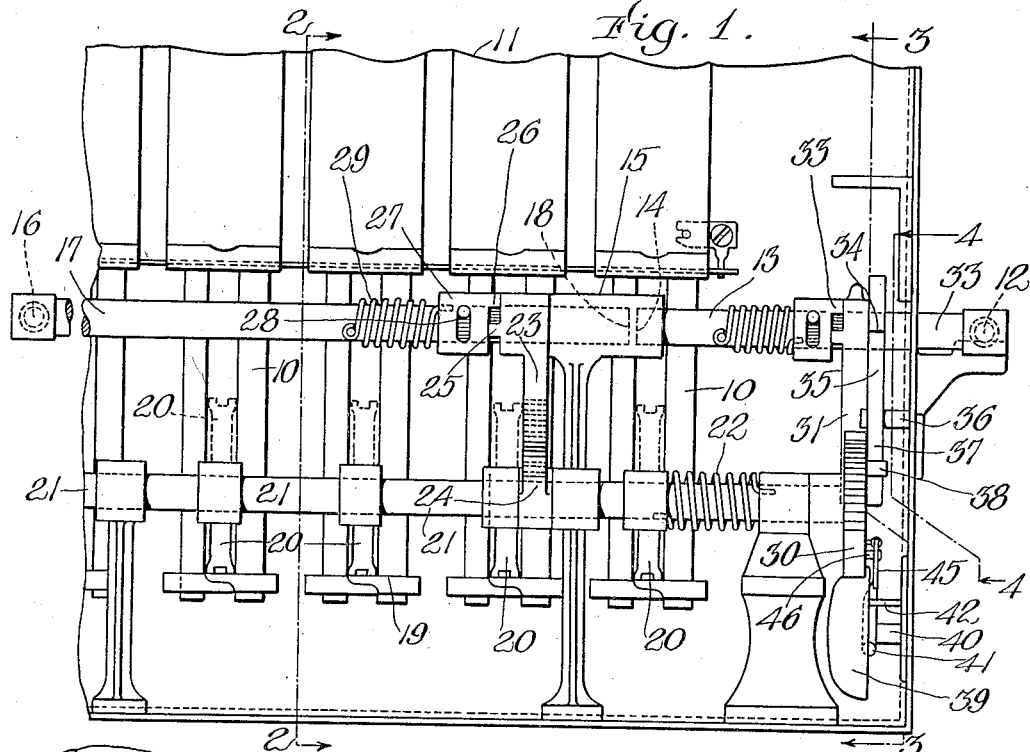
Fig. 1.
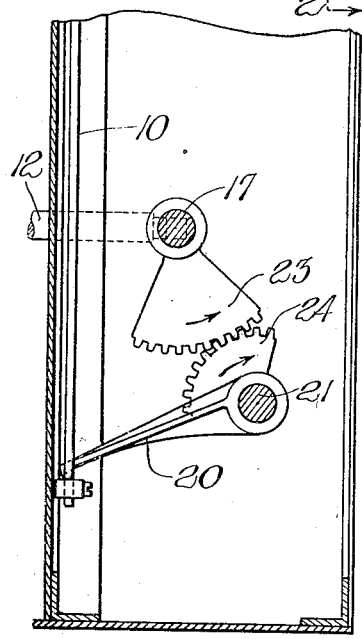
Fig. 2.
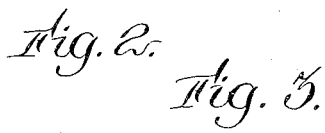
Fig. 3.
Fig. 4.
Witnesses:
Theresa Guggenheim
Louise A. Jordan
Inventor:
James A. Butler,
by Clyde L. Rogers
his Attorney.

UNITED STATES PATENT OFFICE.

JAMES A. BUTLER, OF WINTHROP, MASSACHUSETTS, ASSIGNOR TO AMERICAN VOTING MACHINE COMPANY, OF BOSTON, MASSACHUSETTS, A CORPORATION OF MAINE.

CONTROLLING DEVICE FOR VOTING-MACHINES AND THE LIKE.

1,156,028.  Specification of Letters Patent.  Patented Oct. 5, 1915.

Application filed December 26, 1912. Serial No. 738,771.

*To all whom it may concern:*

Be it known that I, JAMES A. BUTLER, resident of Winthrop, in the county of Suffolk and State of Massachusetts, have invented certain new and useful Improvements in Controlling Devices for Voting-Machines and the like, of which the following is a specification.

My invention relates to controlling devices for voting and like machines and more especially to mechanism operable by the voter or other operator on his entrance to and exit from the machine, for governing the locking and unlocking of the registering mechanism and the guard members which control entrance to, and exit from the machine.

Among the special objects of the invention are to provide controlling mechanism adapted to more effectively and certainly control the locking and unlocking of the registering mechanism than is the case in existing apparatus and whereby possibility of illegitimate voting by manipulation of the controlling device is eliminated; to provide a device operative with equal certainty irrespective of the extent of movement of the parts connected with the registering mechanism; to provide an improved organization of parts adapted to respond with certainty and precision to operative impulse and to react automatically with a like certainty to complete the cycle of operation.

Further objects of the invention are to provide means whereby the levers or other members controlling entrance to and exit from the machine are securely and strongly locked in operative position during the proper intervals, and in general to improve the construction and coöperative arrange of the mechanical details of the device.

The above and other objects of the invention will be better understood from the following detailed description taken in connection with the accompanying drawings and will be thereafter pointed out in the appended claims.

Referring to the drawings, Figure 1 is an elevation with parts broken away of the lower portion of a voting machine wherein a preferred embodiment of my present invention is incorporated; Fig. 2 is a sectional view on line 2—2 of Fig. 1; Fig. 3 is a sectional view on line 3—3 of Fig. 1; and Fig. 4 is a detail section on line 4—4 of Fig. 1.

While in certain aspects the invention has other and wider fields of usefulness, it is specially designed for use with a type of voting machine wherein the registering mechanism is controlled by a series of vertically slidable bars 10 mounted in the voting machine housing designated generally 11. Access to the machine is controlled by a member 12 shown as a pivoted lever mounted on an outer projecting end of a shaft 13 suitably journaled in bearings some little distance above the bottom of the machine, the inner end of this shaft being indicated at 14 fitting in a bearing sleeve 15. The exit controlling member is shown as a lever 16 extending at the same side of the machine as the lever 12 and mounted on the projecting end of a shaft 17 shown as mounted in axial alinement with the shaft 13 with its inner end 18 also journaled in the bearing sleeve 15. The vertically slidable bars 10 which control the registering mechanism, hereinafter termed the controlling bars, have bottom pieces 19 engageable by lever arms 20 fixed to a shaft 21 which extends across the machine somewhat below the shafts 13, 17, this shaft having a stout torsion spring 22 operative thereon constantly tending to turn the same in a direction to lift the lever arms 20 to permit elevation of the controlling bars 10. The shaft 21 is operated by the entrance and exit levers through the shafts 13, 17 in the following manner. Exit lever shaft 17 has loosely mounted thereon a gear segment 23 meshing with a gear segment 24 fixed on the shaft 21. The hub of gear segment 23 has a shoulder projection 25 engageable by a like shoulder 26 on a sleeve 27 mounted on the shaft 17, there being a one-direction yielding connection of shaft 17 with this sleeve consisting in a pin and elongated slot 28 in conjunction with a coil spring 29 secured at one end to said sleeve and at the other to said shaft in known manner.

The parts are so arranged that as the exit lever 16 is raised from its normal horizontal position to a vertical one to permit exit of the voter, the described connections will move the arms 20 downward against the bottom pieces 19 of the controlling bars, and as the exit lever is swung back to a horizontal position the shaft 21 is held in position to keep the controlling bars locked down until the entrance lever 12 is operated, in the following manner: The shaft 21 has fixed thereon a ratchet disk 30, the teeth of which are engageable by a pawl arm 31 loosely mounted on the shaft 13 and having a spring 32 normally holding it against the teeth of the ratchet wheel. The pawl arm 31 has a one-direction yielding connection 33 with the shaft 13 shown as similar to that of the gear segment 23 with the shaft 17. These parts are so arranged that while the entrance lever is down in horizontal position the pawl arm 31 will remain in engagement with a ratchet tooth 30 holding the shaft 21 in position to lock the controlling bars 10 in lowered position. As soon, however, as the entrance lever is lifted by the incoming voter the pawl arm 31 being disengaged from the ratchet wheel 30, the spring 22 at once turns the shaft 21, raising the arms 20 and unlocking the controlling bars 10.

It is important that strong reliable means be provided for holding the inlet lever locked in position to bar entrance to another person while a voter is using the machine and for this purpose I provide a shoulder piece 34 fixed on the shaft 13 in position to be engaged by the end of one arm 35 of a stop lever pivoted at 36 and having its other arm 37 engageable by a pin 38 on the ratchet wheel 30. The lever arms 35, 37 have provision, as shown being self operative by gravity, so that the arm 35 normally seeks to move in position to engage the stop shoulder 34 thus holding the entrance lever locked down. When the ratchet wheel 30 is turned by the swinging up of the exit lever as the voter goes out the pin 38 trips the said locking lever so that the entrance lever can again be moved to admit another voter.

In practice the pivot pin 36, the lever arm 35 and the stop shoulder 34 are made of stout construction and this simple direct locking device is adapted to securely hold the entrance lever against mischievous or malevolent attempts to improperly operate the same.

The present controlling device is well adapted for use with a voting machine of the general type shown in the patent to Johnson, No. 737,412, patented August 25, 1903, and the locking provision consisting in the ratchet wheel 30 and pawl arm 31 is of special advantage for use with such a machine, or a machine wherein the vertically slidable controlling bars have variable degrees of downward movement depending on the number of candidates to be voted for under any particular candidacy or classification, for the reason that this involves a different degree of turning movement of shaft 21 to properly lock the controlling bars in lowermost position at different times and the pawl and ratchet wheel connection 30 and 31 is adapted to perform its locking function with equal certainty and effectiveness irrespective of the extent of such turning movement. The yielding one-way connections between the shaft 17 and the gear segment 23, and between the shaft 13 and pawl arm 31 are also specially useful in permitting the entrance and exit lever movements to operate the parts controlled thereby properly, irrespective of the amount of operative movement required of such parts.

A further feature of the invention consists in a signal device adapted to operate as a voter leaves the machine to indicate that the voter has finished using the machine and departed, so that it is ready for another voter to enter. To this end in the present embodiment I provide a bell 39 mounted on a post 40 in the lower part of the housing having a striker 41 pivoted at 42 with a spring 43 to pull it toward the bell. A projecting arm 44 on this striker is engageable by a lever piece 45 pivotally mounted on the ratchet disk 30 with a one-way operative connection as seen at 46. The arm 45 is thus adapted to move back without striking the bell as the parts are automatically restored to operative position as a voter enters the machine but as the shaft 21 is turned in the opposite direction as the voter is leaving the machine the bell is struck in a manner that will be readily understood, indicating that the machine is ready for another voter.

It will be observed that when the arms 20 are once moved to locking position by the outgoing voter as he swings the lever 16 up, they are securely held in such position without possibility of unlocking by anything except the actuation of the entrance lever by the next incoming voter, this result being attained by the pawl and ratchet device 30, 31, which is only released from operative engagement by the swinging up of the entrance lever. The gear connection 23, 24 for actuating the locking arms 20 from the exit lever 16 provides a connection which operates with equal facility and certainty in all positions of the parts without possibility of binding or wedging action as is the case where cams or like mechanical elements are employed. I am aware that the various features of the invention described can be embodied in other forms besides the one shown and I therefore desire the described embodiment of the invention to be considered in an illustrative and not in a restrictive sense, and I refer to the appended claims rather than to the foregoing description to indicate the scope of the invention.

Having described my invention, what I claim as new and desire to secure by Letters Patent is:

1. Apparatus of the kind described, comprising entrance and exit guarding elements, connections therefrom to registering mechanisms, and means arranged to exert a locking action on said mechanisms, said entrance and exit guarding elements having operative connections for mutual control of said locking means, the connection of the exit guarding element being permanently geared with said locking means to control the same in both directions of movement for the purpose stated.

2. Apparatus of the kind described comprising an entrance lever, an exit lever, connections to registering mechanisms, a shaft having provision for locking said connections, and connecting devices from said entrance and exit levers to said shaft consisting in a geared connection of the exit lever with the shaft and a locking device controlled by the entrance lever for coöperation with said shaft throughout the range of turning movement thereof.

3. Apparatus of the kind described comprising an entrance lever, an exit lever, connections to registering mechanism, a shaft having provision for locking said connections, devices connecting said entrance and exit levers with said shaft consisting in a permanent connection with lost motion provision between the exit lever and the shaft, and a pawl and ratchet locking connection controlled by the entrance lever and arranged to be operative in all positions of turning movement of the shaft.

4. Apparatus of the kind described comprising an entrance lever, an exit lever, connections to registering mechanism, a shaft having provision to control said connections having spring means for urging it to an unlocking position, geared connections from the exit lever for turning said shaft to a locking position, and means controlled by the entrance lever for freeing said shaft to permit its return to unlocking position.

5. Apparatus of the kind described comprising an entrance guarding element, an exit guarding element, connections to registering mechanisms, a shaft having provision for controlling said connections with spring means for urging it normally to an unlocking position, geared connections for controlling said shaft from said exit controlling element, a ratchet wheel on said shaft and a pawl mounted for control by the entrance guarding element for coöperation with said ratchet to lock and release the same for the purpose as stated.

6. Apparatus of the kind described comprising an entrance guarding element, an exit guarding element, connections to registering mechanism, a shaft having provision for controlling said connections with spring means normally urging it to an unlocking position, and connections from said exit and entrance guarding elements arranged to govern the movement and locking of said shaft in all positions throughout the range of turning movement thereof, said connections having lost motion engagement with the exit and entrance guarding elements respectively.

7. Apparatus of the kind described comprising an entrance guarding element, an exit guarding element, connections to registering mechanism having governing devices for mutual control from said entrance and exit guarding elements, said governing devices being also arranged to cause the entrance and exit guarding elements to exert a mutual interlocking action on each other, and a separate abutment lock arranged for automatic action to prevent untimely movement of the entrance guarding element.

8. Apparatus of the kind described comprising an entrance guarding element, an exit guarding element, connections to registering mechanism, connecting devices from said entrance and exit guarding elements to control the connections to the registering mechanism throughout variable ranges of movement thereof, a fixed abutment member carried by the entrance guarding element, a movable stop member coöperative with said abutment, and means for controlling the movement of said member whereby untimely movement of the entrance guarding element is prevented.

In testimony whereof I have affixed my signature, in presence of two witnesses.

JAMES A. BUTLER.

Witnesses:
  D. H. DONOVAN,
  WM. E. AUTHIER.